United States Patent
Beelen et al.

(10) Patent No.: US 8,510,895 B2
(45) Date of Patent: Aug. 20, 2013

(54) DISPLAY DEVICE FOR A WIPER BLADE

(75) Inventors: Hans Beelen, Herk de Stad (BE);
Renaat Van Roelen, Vissenaken (BE);
Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 12/680,430

(22) PCT Filed: Sep. 23, 2008

(86) PCT No.: PCT/EP2008/062684
§ 371 (c)(1),
(2), (4) Date: Mar. 26, 2010

(87) PCT Pub. No.: WO2009/065647
PCT Pub. Date: May 28, 2009

(65) Prior Publication Data
US 2010/0306950 A1    Dec. 9, 2010

(30) Foreign Application Priority Data
Nov. 22, 2007    (DE) .......................... 10 2007 056 322

(51) Int. Cl.
*B60S 1/04* (2006.01)
(52) U.S. Cl.
USPC ............. 15/250.201; 15/250.001; 15/250.361
(58) Field of Classification Search
USPC ........................ 15/250.001, 250.201, 250.361
IPC ............................................. B60S 01/04, 01/38
See application file for complete search history.

(56) References Cited

U.S. PATENT DOCUMENTS

| | | | | |
|---|---|---|---|---|
| 2,650,355 A | * | 8/1953 | Pieczonka | 362/540 |
| 5,276,937 A | * | 1/1994 | Lan | 15/257.01 |
| 5,305,190 A | * | 4/1994 | Clement | 362/503 |
| 5,349,718 A | | 9/1994 | Gibbon | |
| 5,867,094 A | * | 2/1999 | Tonne | 340/468 |
| 6,047,436 A | | 4/2000 | Rohrbach et al. | |
| 6,353,961 B1 | * | 3/2002 | Lin | 15/250.001 |
| 6,523,218 B1 | | 2/2003 | Kotlarski | |
| 6,973,697 B2 | * | 12/2005 | Shen | 15/250.201 |
| 7,194,781 B1 | | 3/2007 | Orjela | |

(Continued)

FOREIGN PATENT DOCUMENTS

DE    3639831 A1    5/1988
FR    2860470 A1    4/2005

(Continued)

OTHER PUBLICATIONS

FR2860470translation, EPO Machine Translation, pp. 1-3.*

(Continued)

*Primary Examiner* — William Gilbert
*Assistant Examiner* — Alp Akbasli
(74) *Attorney, Agent, or Firm* — Michael Best & Friedrich LLP

(57) ABSTRACT

The invention relates to a display device (38) for a wiper blade (10) made up of a plastic piece with a display field (40, 42, 44) with means (52) for clipping to the wiper blade (10). According to the invention, said device has the same cross-sectional profile as a spoiler (30) for the wiper blade (10) of flat bar construction, wherein the inner profile (50) of the display device (38) matches the outer profile (32, 34, 36) of the spoiler (30).

31 Claims, 2 Drawing Sheets

(56) References Cited

U.S. PATENT DOCUMENTS

| | | | |
|---|---|---|---|
| 7,246,403 B2 * | 7/2007 | Ohyama | 15/250.351 |
| 2004/0177466 A1 * | 9/2004 | Ohyama | 15/250.351 |
| 2005/0246852 A1 * | 11/2005 | Shen | 15/250.201 |
| 2006/0026786 A1 | 2/2006 | Ku | |
| 2007/0084008 A1 * | 4/2007 | Hwa | 15/250.201 |
| 2008/0263810 A1 | 10/2008 | De Block et al. | |
| 2009/0025174 A1 | 1/2009 | Braun et al. | |

FOREIGN PATENT DOCUMENTS

| | | |
|---|---|---|
| RU | 2268176 | 1/2006 |
| WO | 95/01896 A1 | 1/1995 |
| WO | WO 2007071508 A1 * | 6/2007 |
| WO | 2008/145481 A1 | 12/2008 |

OTHER PUBLICATIONS

PCT/EP2008/062684 International Search Report.

* cited by examiner

DISPLAY DEVICE FOR A WIPER BLADE

BACKGROUND OF THE INVENTION

The invention relates to a display device for a wiper blade.

WO 95/01896 discloses a display device in the form of a clip made from plastic, said device being fastened on a supporting bracket system of a wiper blade. The plastic part is produced from a material whose color changes so strongly over the course of approximately six months under the action of one of the environmental influences that this comes to the notice of the driver of the vehicle, who undertakes the requisite change of wiper blade. The plastic part can be latched on a bracket of the supporting bracket system. To this end, said plastic part has on its underside deflectable latching hooks that engage in a bracket through cutouts while undergoing spring expansion.

U.S. Pat. No. 6,047,436 discloses a wiper blade on whose supporting bracket system there is likewise fastened a display device that measures and displays the cumulative ozone loading. The color of the display field of the display device changes as a function of the ozone loading. Furthermore, DE 699 25 738 C2 discloses a display device that is fastened on a wiper blade with a supporting bracket system. The display field of the display device changes its color as a function of the time period over which the display device has been exposed to water.

SUMMARY OF THE INVENTION

According to the invention, the display device has a cross-sectional profile the same as that of a spoiler of the wiper blade of flat bar construction. Here, the inner profile of the display device matches the outer profile of the spoiler. Consequently, it is possible to implement large display fields that are not overlooked by the vehicle driver. Nevertheless, the wiping function and the noise development are not unfavorably influenced. Moreover, it is advantageously possible to provide a plurality of display fields separated from one another. These can be divided between an inflow side and an outflow side of the display device. It is advantageous in this case for display fields that display loading from environmental parameters to be placed on the outflow side of the display device, since said outflow side is, as a rule, most exposed to the environmental influences in the parking position of the wiper blade. It is also possible to provide a plurality of delimited display fields that detect the influences of different factors of weather or environment individually and separately.

It is also advantageous to provide details of the wiper blade manufacturer on the same side so that a new wiper blade or a wiper strip can be obtained if necessary without great effort. It is proposed in accordance with one refinement of the invention that a display field for details of a vehicle manufacturer is provided on the inflow side of the display device. Depending on need and design requirements, the display device can extend over a comparatively short or comparatively long length of the spoiler.

In accordance with a further refinement of the invention, the display field consists of a basic material or is coated with such a material that changes color with the time loading imposed by the influences from weather or environment and includes a legend whose color is the same as the initial color of the material of the display field, but does not change or does so differently from the basic material of the display field. It is possible to accommodate in such a display field information that becomes visible with the aging of the wiper blade, for example the type designation and/or the kit number for a new replacement part.

BRIEF DESCRIPTION OF THE DRAWINGS

Further advantages emerge from the following description of the drawing. An exemplary embodiment of the invention is illustrated in the drawing. The drawing, the description and the claims contain numerous features in combination. The person skilled in the art will also give appropriate consideration to the features individually and will combine them to form further suitable combinations.

In the drawing.

DETAILED DESCRIPTION

Figure 1:
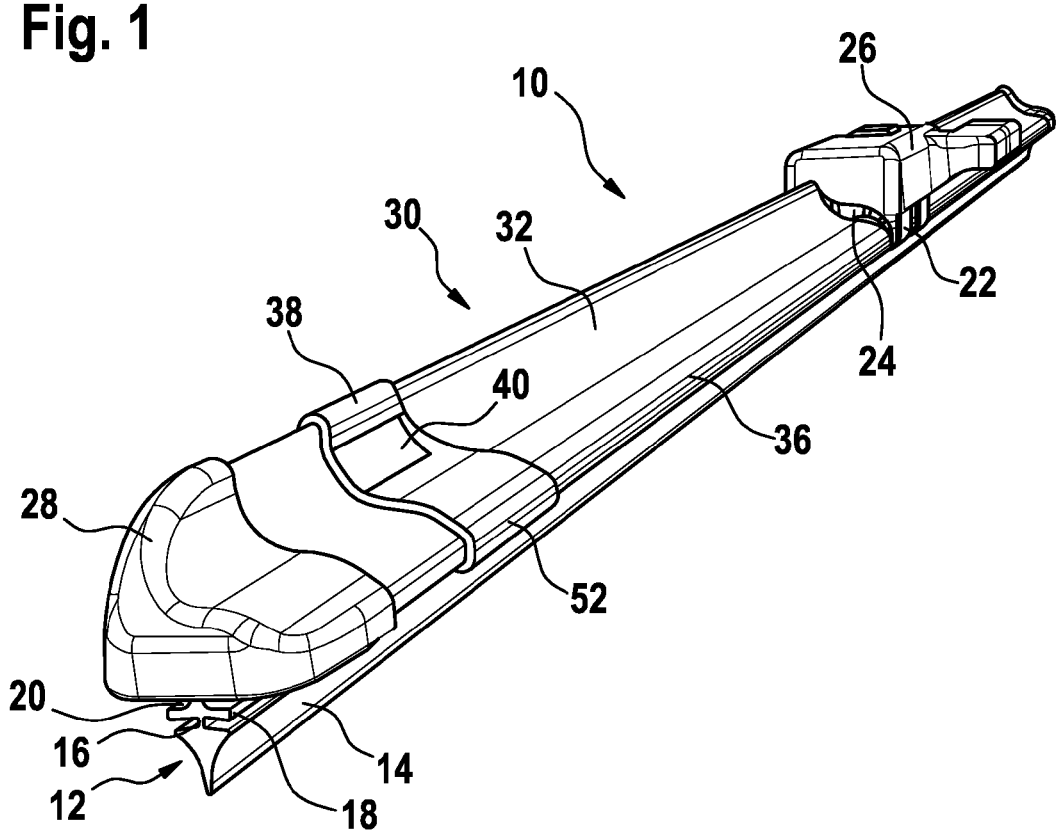
FIG. 1 shows a perspective view of a wiper blade with an inventive display device from an inflow side.
Figure 2:
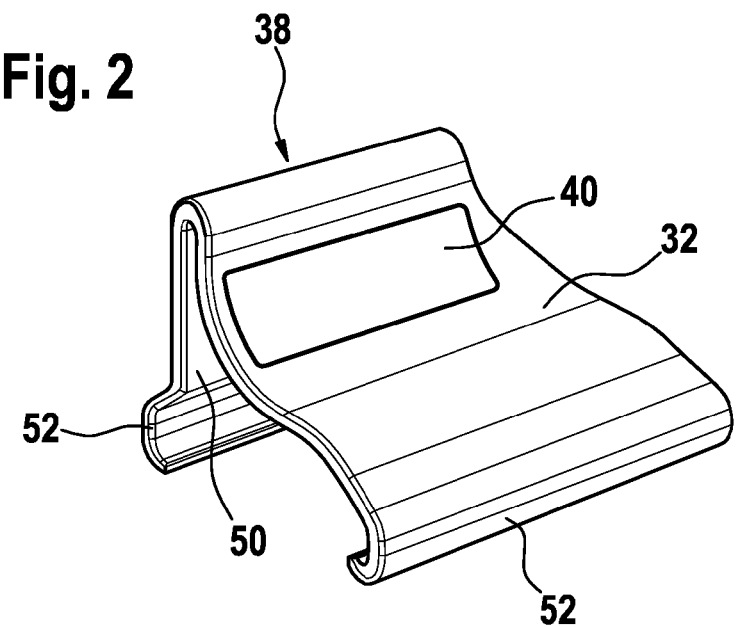
FIG. 2 shows a perspective view of a display device according to FIG. 1, on an enlarged scale.
Figure 3:
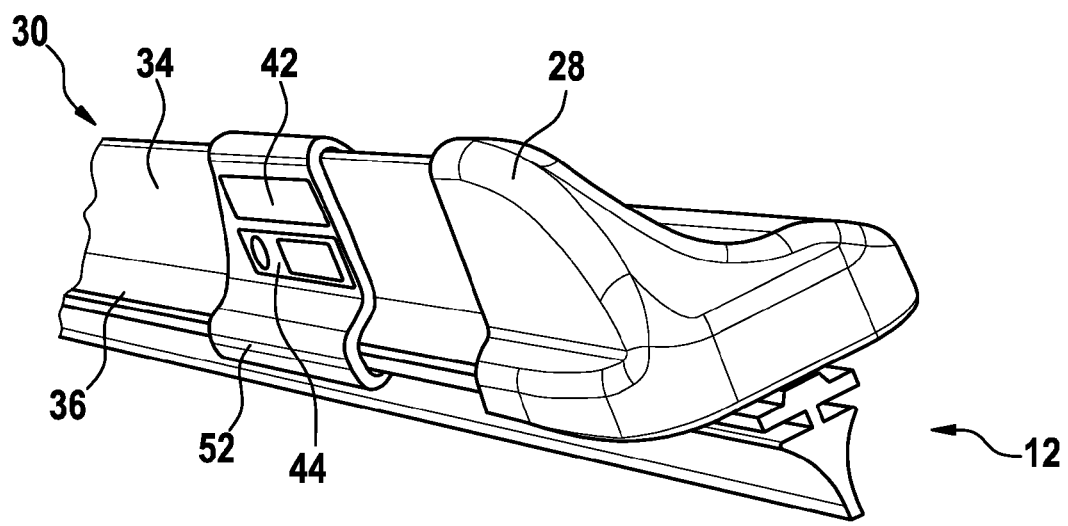
FIG. 3 shows a perspective view of a wiper blade according to FIG. 1 from an outflow side.
Figure 4:
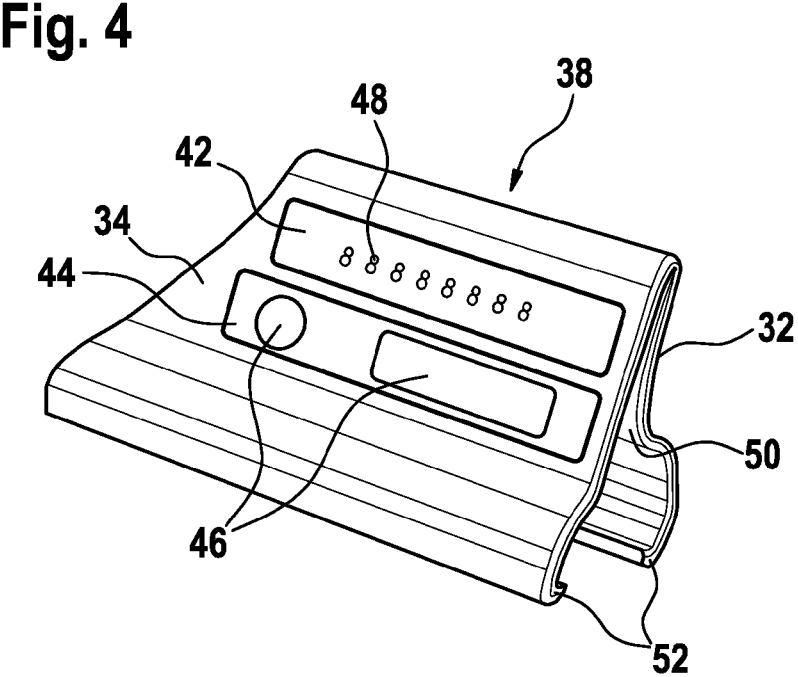
FIG. 4 shows a perspective view of a display device according to FIG. 3, on an enlarged scale.

A wiper blade 10 comprises a wiper strip 12 whose wiper lip 14 is connected to a head strip 18 via a tilting web 16. Inserted into horizontal longitudinal grooves 20 of the head strip 18 as supporting element are spring rails that are covered by a spoiler 30 mounted on the spring rails. End caps 28 seal the spoiler 30 at its ends. A connecting element 24 with claws 22 is fastened on the spring rails in the middle region of the wiper blade 10. The connection element 24 serves the purpose of connecting a wiper arm in an articulated fashion via its connecting element 26.

On its inflow side 32, the spoiler 30 has a flow profile by means of which the wiper blade 10 is pressed against a vehicle window (not illustrated) by the relative wind as a motor vehicle is being driven. The inflow side 32 is connected to an outflow side 34 on its side averted from the wiper strip 12. The free longitudinal edges of the inflow side 32 and the outflow side 34 form edges 36 that embrace the spring rails.

A display device 38 made from plastic is fastened on the outer profile of the spoiler 30. It has in essence the same cross-sectional profile as the spoiler 30, an inner profile 50 of the display device 38 matching the outer profile of the spoiler 30 that is formed in essence by the inflow side 32, the outflow side 34 and the edges 36. On the edges 36 facing the wiper strip 12 the display device 38 has claws 52 with the aid of which it is clipped onto the spoiler 30 and held there. The display device 38 has a plurality of display fields 40, 42, 44 that are separated from one another. The arrangement and use of the display fields 40, 42, 44 are basically arbitrary, but it can be advantageous to provide on the inflow side 32 a display field 40 for information of the vehicle manufacturer, while on the outflow side 34, which points outward as a rule in the parking position of the wiper blade 10, it is expedient to provide one or more display fields 42 for displaying the loading and wear imposed by influences from weather and environment. Furthermore, a display field 44 is provided for information of the wiper blade manufacturer 46. Finally, the display field 42 that indicates the influence of factors relating to weather and environment includes a legend 48 whose color is the same as the initial color of the basic material of the display field 42, but does not change or does so differently from the basic material of the display field 42. Consequently, the legend 48 cannot be read in the new state and stands out from the basic material of the display field 42 only as the load increases. The legend 48 can contain information relating to the type designation and the numbers of the replacement parts. If the basic material of the display field 42 is black in the new state, and if it changes color to yellow with increasing UV irradiation, in the worn-out state the legend 48 emerges as black script on a yellow background. However, other differences are also conceivable, for example although in the worn-out state the legend has a color the same as that of the basic material, it is clearly lighter or darker.

The invention claimed is:

1. A display device (38) for a wiper blade (10) of flat bar construction, which display device comprises a plastic part with a display field (40, 42, 44) and has means (52) for clipping onto the wiper blade (10), characterized in that the display device (38) has a cross-sectional profile the same as that of a spoiler (30) of the wiper blade (10), the spoiler (30) having an outer profile, an outer profile of the display device (38) substantially conforming to the outer profile (32, 34, 36) of the spoiler (30), a thickness of the display device (38) being substantially uniform.

2. The display device (38) as claimed in claim 1, characterized in that the display device (38) has a plurality of display fields (40, 42, 44) separated from one another.

3. The display device (38) as claimed in claim 1, characterized in that provided on an outflow side (34) is a display field (42) that changes its color as a function of the time loading imposed by influences from weather or environment.

4. The display device (38) as claimed in claim 1, characterized in that the display field (42) includes a basic material or is coated with a basic material that changes color with the time loading imposed by the influences from weather or environment and includes a legend (48) whose color is the same as the initial color of the basic material of the display field (42), but does not change or does so differently from the basic material of the display field (42).

5. The display device (38) as claimed in claim 2, characterized in that a display field (44) for details of a wiper blade manufacturer is provided on an outflow side (34).

6. The display device (38) as claimed in claim 1, characterized in that a display field (40) for details of a vehicle manufacturer is provided on an inflow side (32).

7. The display device (38) as claimed in claim 2, characterized in that provided on an outflow side (34) is a display field (42) that changes its color as a function of the time loading imposed by influences from weather or environment.

8. The display device (38) as claimed in claim 7, characterized in that the display field (42) includes a basic material or is coated with a basic material that changes color with the time loading imposed by the influences from weather or environment and includes a legend (48) whose color is the same as the initial color of the basic material of the display field (42), but does not change or does so differently from the basic material of the display field (42).

9. The display device (38) as claimed in claim 8, characterized in that a further display field (44) for details of a wiper blade manufacturer is provided on the outflow side (34).

10. The display device (38) as claimed in claim 9, characterized in that a display field (40) for details of a vehicle manufacturer is provided on an inflow side (32).

11. A wiper blade (10) of flat bar construction, comprising a spoiler (30) having an outer profile and a display device (38), the display device including a plastic part with a display field (40, 42, 44), and means (52) for clipping onto the wiper blade (10), characterized in that the display device has a cross-sectional profile the same as that of the spoiler (30), an outer profile of the display device (38) substantially conforming to the outer profile (32, 34, 36) of the spoiler (30), a thickness of the display device (38) being substantially uniform.

12. The wiper blade (10) as claimed in claim 11, characterized in that the display device (38) has a plurality of display fields (40, 42, 44) separated from one another.

13. The wiper blade (10) as claimed in claim 11, characterized in that provided on an outflow side (34) of the display device (38) is a display field (42) that changes its color as a function of the time loading imposed by influences from weather or environment.

14. The wiper blade (10) claimed in claim 11, characterized in that the display field (42) consists of a basic material or is coated with a basic material that changes color with the time loading imposed by the influences from weather or environment and includes a legend (48) whose color is the same as the initial color of the basic material of the display field (42), but does not change or does so differently from the basic material of the display field (42).

15. The wiper blade (10) as claimed in claim 12, characterized in that a display field (44) for details of a wiper blade manufacturer is provided on an outflow side (34) of the display device (38).

16. The wiper blade (10) as claimed in claim 11, characterized in that a display field (40) for details of a vehicle manufacturer is provided on an inflow side (32) of the display device (38).

17. The wiper blade (10) as claimed in claim 12, characterized in that provided on an outflow side (34) of the display device (38) is a display field (42) that changes its color as a function of the time loading imposed by influences from weather or environment.

18. The wiper blade (10) claimed in claim 17, characterized in that the display field (42) consists of a basic material or is coated with a basic material that changes color with the time loading imposed by the influences from weather or environment and includes a legend (48) whose color is the same as the initial color of the basic material of the display field (42), but does not change or does so differently from the basic material of the display field (42).

19. The wiper blade (10) as claimed in claim 18, characterized in that a further display field (44) for details of a wiper blade manufacturer is provided on the outflow side (34).

20. The wiper blade (10) as claimed in claim 19, characterized in that a display field (40) for details of a vehicle manufacturer is provided on an inflow side (32) of the display device (38).

21. The display device (38) as claimed in claim 1, characterized in that the display device (38) has an inner profile (50) matching the outer profile (32, 34, 36) of the spoiler (30).

22. The display device (38) as claimed in claim 21, characterized in that the spoiler has an inflow side (32) with a curved profile and a generally linear outflow side (34), and in that an inner profile (50) matches the profile of the inflow side (32) and the outflow side (34).

23. The display device (38) as claimed in claim 1, characterized in that the wiper blade (10) has a connecting element (24) operable to connect the wiper blade (10) to a wiper arm, and in that the display device (38) is separate from the connecting element (24).

24. The display device (38) as claimed in claim 1, characterized in that the spoiler (30) has edges (36) engaging spring rails of the wiper blade (10), and in that the display device (38) has claws (52) which clip onto the spoiler (30).

25. The display device (38) as claimed in claim 4, characterized in that the legend (48) is not perceptible in a new state of the basic material as a result of the legend (48) having the same color as the initial color of the basic material.

26. The wiper blade (10) as claimed in claim 11, characterized in that the display device (38) has an inner profile (50) matching the outer profile (32, 34, 36) of the spoiler (30).

27. The wiper blade (10) as claimed in claim 26, characterized in that the spoiler has an inflow side (32) with a curved profile and a generally linear outflow side (34), and in that the inner profile (50) matches the profile of the inflow side (32) and the outflow side (34).

28. The wiper blade (10) as claimed in claim 11, characterized in that the wiper blade (10) further comprises a connecting element (24) operable to connect the wiper blade (10) to a wiper arm, and in that the display device (38) is separate from the connecting element (24).

29. The wiper blade (10) as claimed in claim 11, characterized in that the spoiler (30) has edges (36) engaging spring rails of the wiper blade (10), and in that the display device (38) has claws (52) which clip onto the spoiler (30).

30. The wiper blade (10) as claimed in claim 14, characterized in that the legend (48) is not perceptible in a new state of the basic material as a result of the legend (48) having the same color as the initial color of the basic material.

31. The display device (38) as claimed in claim 1, characterized in that the display device (38) has a uniform cross-section throughout the display field (40).

* * * * *

UNITED STATES PATENT AND TRADEMARK OFFICE
CERTIFICATE OF CORRECTION

PATENT NO.        : 8,510,895 B2                                        Page 1 of 1
APPLICATION NO.   : 12/680430
DATED             : August 20, 2013
INVENTOR(S)       : Beelen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 282 days.

Signed and Sealed this
Fifteenth Day of September, 2015

Michelle K. Lee
*Director of the United States Patent and Trademark Office*